Patented July 15, 1930

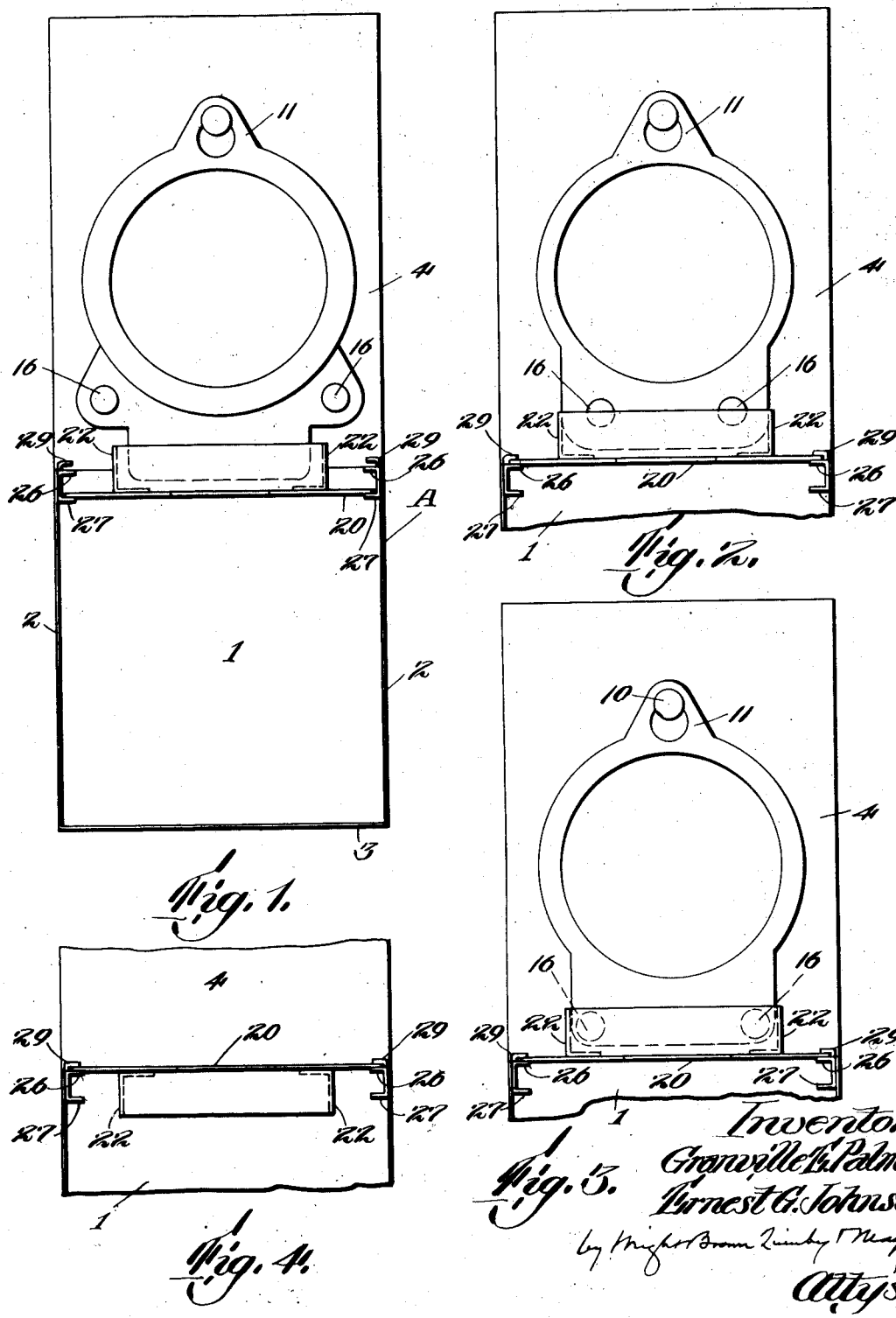

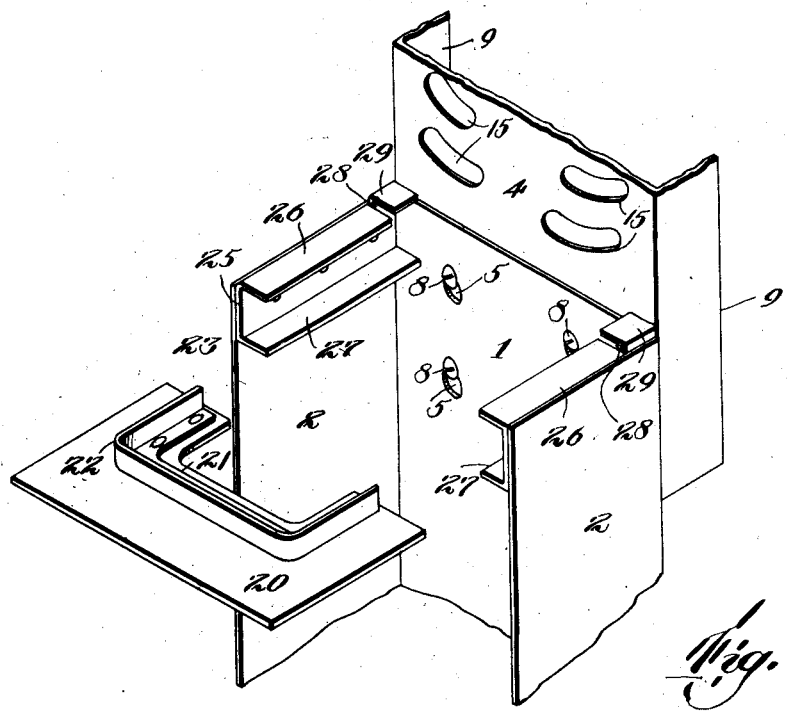
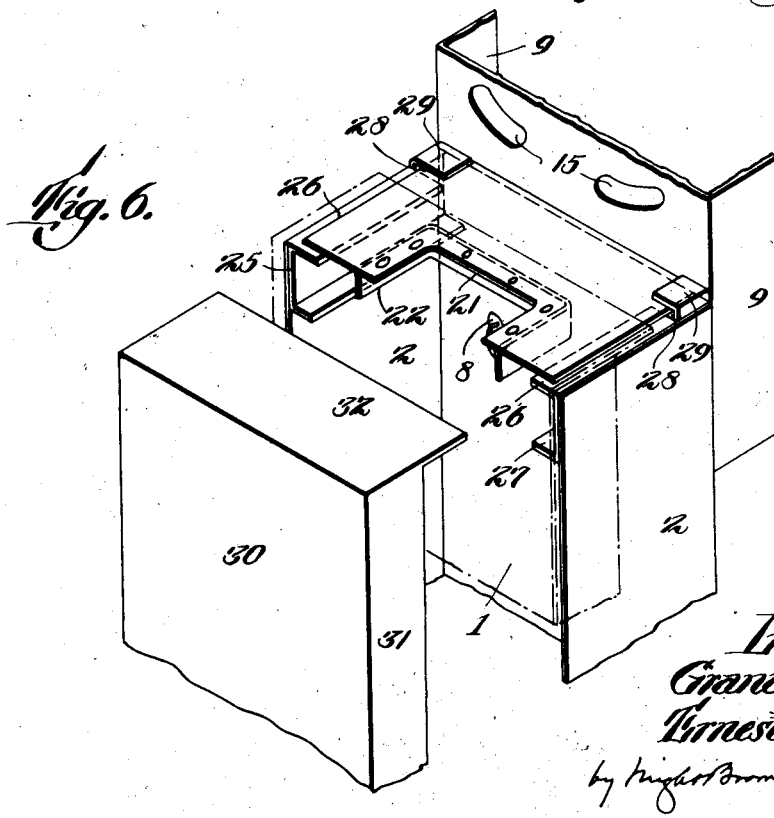

1,770,425

UNITED STATES PATENT OFFICE

GRANVILLE E. PALMER, OF BROOKLINE, AND ERNEST G. JOHNSON, OF BOSTON, MASSACHUSETTS, ASSIGNORS, BY MESNE ASSIGNMENTS, TO THE PALMER ELECTRIC & MANUFACTURING CO., OF WALTHAM, MASSACHUSETTS, A CORPORATION OF MASSACHUSETTS

SWITCH CASING AND METER ADAPTER

Application filed January 27, 1923. Serial No. 615,320.

In connection with electric meter installations it is usual practice to associate with the meter service switches and protective devices, the switches and protective devices often being contained in protective casings with which the meters may be assembled in such a manner that no conductors on the service side of the meters are accessible to unauthorized persons who might otherwise attempt to bridge across the meters and use current not being registered thereon.

There are at present several makes of meters in common use differing from each other in size and style, many power and lighting companies using some or all of these. In order to accommodate any one of these various meters it has been proposed to form the casing with one open side to be more or less closed by interchangeable adapter plates, one of these plates being formed to properly fit each of the meters. It has therefore been necessary for the companies to keep in stock some of each of these adapter plates, and when a meter is to be installed or replaced by another, it is necessary to deliver a corresponding adapter plate with each meter. In replacement, should the same type of meter be found already in use, the new adapter plate is superfluous, but in other cases it is necessary. It has also been necessary to keep on hand a supply of imperforate plates to completely close the casing to prevent access to the service terminals when service is discontinued and the meter removed.

According to the present invention the casing and adapter plate are so formed that a single plate may be employed to properly cooperate with a variety of meters and to completely close the casing when it is desired to remove the meter. It is therefore rendered unnecessary for the service company to keep any considerable stock of such plates beyond those actually in use as it is unnecessary to send out an adapter plate with each meter or a closure plate when service is to be discontinued.

It has also been proposed to extend one wall of the casing for the attachment of the meter. This causes the casing to be of an awkward shape for packing, it being usual to pack two together, the extension of one overlapping the body portion of the other. Handling of one alone is unsatisfactory so that orders of odd numbers are not desirable.

According to this invention the extension is formed of a separate piece readily attachable thereto in the desired relation for supporting the meter, but arranged to be packed in compact overlapping form therewith for handling or storing. Each meter is commonly provided with a loop at its upper end for engagement with a screw projecting from the forward face of the supporting plate and as it is necessary for the meter to hang accurately vertically, the adapters heretofore used have loosely fitted the meters to permit slight inaccuracy in the setting up of the casing without interfering with the proper positioning of the meter. This causes comparatively large spaces between the adapter and meter through which dirt and other foreign matter may enter the casing and reach the mechanism therein. According to the present invention the adapter may be made to more closely fit the meter, it being capable of motion with the meter as the latter is adjusted to its final position while maintaining the casing opening closed.

For a more complete understanding of this invention, together with further objects and advantageous details and combinations of parts, reference may be had to the accompanying drawings in which Figure 1 is a front elevation of a casing and meter support, the cover of the casing being removed, showing the adapter plate arranged to fit one type of meter.

Figures 2 and 3 are fragmentary views similar to a portion of Figure 1, but illustrating the plate as arranged to cooperate with meters of other types.

Figure 4 is a view similar to a portion of Figures 1, 2, and 3 but showing the adapter plate positioned for complete closing of the casing as when no meter is desired.

Figure 5 is a fragmentary perspective of the casing and the adapter plate detached.

Figure 6 is a similar view showing the adapter in the position of Figure 4, and the casing cover detached in full lines and in closed position in dotted lines.

Referring to these figures, the circuit protector comprises a casing A formed of a base plate 1, opposed side plates 2 and an end plate 3, the side and end plates partially defining an area of the base within which the meter protective devices and the switch may be located in any suitable manner. The end of the casing opposite the end 3 is to be bridged by the adapter plate as will be described. Extending from the casing A and detachably fixed thereto is a plate 4 to which the meter may be attached. This plate 4, as shown, overlaps the base 1 of the casing through which may be formed keyhole slots 5 adapted to take over fastening screws 8 fixed to the plate 4. As shown, this plate is provided on opposite edges with stiffening flanges 9.

Positioned a proper distance from the casing 1 the member 4 has a pin or screw 10 projecting therefrom over which may be placed the loop 11 of the meter, the rear face of the meter resting against the forward face of the plate 4 with the terminal portion of the meter extending adjacent the open end of the casing A. The plate 4 is also provided with a plurality of arcuate slots 15 through which may pass bolts or screws engaging in openings 16 provided for that purpose in the meters. These openings 16 are variously spaced in the various styles and makes of meters, the slots 15 being spaced to cooperate with the spacing of the meter openings and being of arcuate form struck from the axis of the screw or pin 10 as a center in order to permit the meters to be swung laterally that they may be adjusted to level position. Figures 1, 2, and 3 illustrate three different types of meters which show openings for the lower fastening means positioned in their relatively different relations.

The terminal portions of the meters also vary somewhat in contour and in distance from the pin 10. In order to close off the open portion of the casing, which is larger than the end of the terminal chamber of any of a plurality of meters of different sizes and styles which may be associated therewith, to prevent access from about the meter to the interior of the casing, the adapter plate shown at 20 has been devised. This plate 20 is provided with an opening or cut out portion 21 extending inwardly from one side thereof and about the margin of this opening and spaced somewhat therefrom is a laterally extending flange member 22. As shown this member is formed as an angle having one flange 23 made fast to one face of the plate 20, the other flange forming the portion 22. The adapter plate is thus in effect an integral structure and has no relatively movable parts. This plate 20 is somewhat shorter than the space between the side walls 2 so that the flange 22 may fairly closely embrace the terminal portion of the meter and move therewith laterally of the housing A as the meter is being leveled.

For the purpose of supporting this adapter plate in position flanged guides 25 arranged in sets are employed. These guides comprise channel members having their upper flanges 26 positioned opposite each other and in facing relation on the opposite sides 2 of the casing, and likewise the lower flanges 27 are oppositely disposed so that either the upper or lower flanges may be used as supports on which the adapter plate 20 may rest. In order that the adapter plate may not be pried up from the upper flange 26 and so removed from the casing, the rear end of this flange 26 may be provided with a slot as 28, the portion of the flange to the rear of this slot being raised upwardly as shown at 29 having its lower face spaced upwardly from the upper face of the forward portion of the flange so that the plate 20 may pass thereunder adjacent the base 1 of the housing. It is unnecessary to provide such a construction for the lower flange 27 as the upper flange 26 prevents removal. With this construction if the adapter plate 20 is placed on the lower flanges 27 the portion 22 forms a socket closely embracing the lower end of the terminal chamber of one of the common types of meters as shown in Figure 1, while if the plate 20 is placed on the upper flanges 26, the flange 22 is positioned to closely embrace and house the terminal portions or chambers of two types of meters such as shown in Figures 2 and 3. The two sets of flanges thus provide for meters having their terminal chambers extending different distances from their upper ends.

It will be noted that the socket for receiving the terminal chambers of certain of the meters is of fixed dimensions being formed by elements which are permanently fixed relative to each other. The member 22 forms front and side walls of the socket, the base of which has an opening 21 of less than its complete area, and smaller than the end of the meter terminal chamber, for the passage of the conductors from the meter into the casing. By this construction access to the interior of the casing between the member 22 and the terminal chamber is effectually prevented when the terminal chamber closely fits the socket as shown in Figures 2 and 3 and effectually baffled should such terminal chamber not closely fit the socket but extend reasonably close to the base of this socket as shown in Figure 1. Some space between the terminal chamber and the socket base is necessary so as to permit the removal or replacement of the plate 20 thus to facilitate placing of the parts and completion of the wiring.

For closing the front face of the casing a cover member 30 may be employed which is provided with lateral flanges 31 which overlie the sides 2 of the casing and a longer end flange 32 which overlies a portion of the adapter plate 20 when it is in position. This overlying flange 32 holds the outer portion of the adapter plate from being removed from the casing by prying upwardly while the main portion of the cover 30 holds the adapter plate closely against the base 1. The cover is adapted to be made fast to the casing by any suitable means and is preferably sealed thereto so that it may not be removed by unauthorized persons without such removal being readily detectable. When a meter is to be installed, the cover 30 having been removed, the meter is placed in position over the pin 10, and made fast thereto in vertical position, the adapter plate is then placed in the proper relation thereto on the guide flanges which suit this particular meter, the cutout portion 21 of the plate being positioned adjacent the base 1, the adapter plate 20 taking its proper position laterally of the casing on its flanges while maintaining close contact therewith. The cover member 30 is then placed in position and sealed. In case it is desired to discontinue service the adapter plate is turned as shown in Figures 4 and 6 so that the cutout portion 21 is outwardly positioned, the uncut edge facing the base 1 and the flange 22 extending inwardly of the casing. The cover 30 is then placed in position, the portion 32 overlying the opening 21 of the adapter and entirely closing it as shown in dotted lines in Figure 6. With this construction, therefore, it is seen that not only may the adapter be related to the casing or housing in such a manner that it may cooperate with meters of various types, but also that it may be so positioned as to entirely close off the housing from unauthorized access when the cover is closed and no meter is in position. A wall of the casing is thus adjustable to cooperate with meter casings of various forms and sizes to prevent unauthorized access to conductors housed by the casing and to complete the closure of the casing when no meter is present. Thus it will be seen that the means which adapts the wall member or adapter to cooperate properly with the various sizes of meter terminal chambers or to complete the closure of the casing when no meter is present are permanently associated with the protector comprising the box casing walls 1, 2 and 3 and the adapter 20, there being no parts separate therefrom which under certain conditions of use are not required and which are therefore liable to be misplaced or lost.

While as shown the meter is positioned above the casing, it is evident that the invention is applicable to meters designed to be supported in other positions relative to the casings.

Having thus described an embodiment of this invention it should be evident to those skilled in the art that many changes and modifications might be made therein without departing from its spirit or scope as defined by the appended claims.

We claim:

1. A meter circuit protector comprising a casing having a movable wall member, said protector including means adapting said wall member to be associated with said casing in a plurality of relations for cooperation with meter casings of various forms and sizes to prevent unauthorized access to conductors housed by the protector.

2. A meter circuit protector comprising a casing having a movable wall member, said protector including means adapting said wall member to be associated with said casing selectively in a plurality of relations for cooperation with meter casings of various forms and sizes to prevent unauthorized access to conductors housed by the protector and for completing the closing of said protector when no meter is associated with said protector.

3. A device of the class described comprising a housing having a base, sides incompletely surrounding an area of said base to leave an open portion, and a cover having a portion partly overlapping said open portion, means for supporting a meter with its terminal portion extending toward said open portion, and a plate having an opening shaped to co-operate with said meter terminal portion and constructed to close the open portion of said sides, said plate being capable of assembly with said housing when no meter is present with said opening overlapped and closed off by said overlapping portion of said cover.

4. A meter circuit protector comprising a casing having an open portion, a movable wall member for bridging said open portion and having an opening therethrough, said protector having means adapting said wall member for selective cooperation with meter casings of various sizes to prevent unauthorized access to conductors within said protector, said opening registering with the terminal chamber of a selected meter casing, and for closing said open portion when no meter is associated with said protector.

5. A device of the class described comprising a housing having a base, sides incompletely surrounding an area of said base to leave an open portion, and a cover having a portion partly overlapping said open portion, means for supporting a meter with its terminal portion extending toward said open portion, a plate having an opening shaped to co-operate with said meter terminal portion to prevent unauthorized access to conductors in said housing, and means for supporting said plate to bridge said open portion selectively at any of a plurality of positions to bring said opening in proper relation to meters of different styles, and to close said opening by the overlapping portion of said cover.

6. A device of the class described comprising a housing having an open side, a cover for said housing having a portion partially overlapping said open side, and a plate for bridging said open side and having an opening therethrough, said device having means adapting said plate for assembly with said casing selectively to expose said opening or to cause said opening to be covered by the overlapping portion of said cover whereby said casing may be partially open or entirely closed when said plate is in position.

7. A casing for enclosing electrical devices having an open side portion, a plurality of spaced guides adjacent said open side portion arranged in sets, and a plate engageable selectively with said sets of guides for partially closing off said open side portion.

8. A device of the class described comprising a casing having a base, side walls partially enclosing an area of said base, and a cover, guides arranged in sets on said side walls, and a member selectively engageable with said sets of guides and bridging the open portion of said side walls between said cover and base.

9. A device of the class described comprising a casing having a base, side walls partially enclosing an area of said base, and a cover, guides arranged in sets on said side walls, and a member selectively engageable with said sets of guides and retained in position by said cover.

10. A device of the class described comprising a casing having an open end, guide flanges carried by the sides of the casing adjacent to said open end, and a meter adapter plate of less length than said open end supported by said flanges and free to move laterally between said sides to conform to the lateral position of the terminal portion of a meter as the meter is leveled, without disengagement from said flanges.

11. A device of the class described comprising a casing having an open portion, a meter adapter for bridging said open portion and cooperating with a meter casing to prevent unauthorized access to conductors in said casing, and means for supporting said adapter permitting lateral adjustment of said adapter relative to said casing to conform to the position of the meter as the meter is leveled.

12. A device of the class described comprising a housing having an open end, channel shaped guides fixed to the sides of said housing adjacent said open end, the flanges of said guides at opposite sides being relatively oppositely disposed, and a meter adapter for bridging said end constructed to be supported selectively on either of the oppositely disposed flanges of said guides.

13. A meter adapter comprising a plate having a cut out portion extending inwardly from one side, and a flange extending laterally from said plate about the margin of said cut out portion and spaced therefrom and constructed to embrace the terminal portion of a meter.

14. A device of the class described comprising a meter support, a meter circuit protector fixed to said support, said meter protector comprising a casing having a movable wall member, means for fixing a meter to said support with its terminal chamber extending toward said casing, and means for fixing said movable wall to said casing in various positions to cooperate with the terminal chambers of meters of different sizes to prevent unauthorized access to conductors housed by said protector.

15. A device of the class described comprising a meter support, a meter circuit protector fixed to said support, means for fixing one portion of a meter casing to said support in a definite position, another portion of said meter casing extending toward said protector and being formed as a terminal chamber, said protector having a movable wall member cooperating with said terminal chamber to prevent unauthorized access to conductors within said casing, and said protector having means for supporting said wall member in different positions relative thereto to properly cooperate with terminal chambers extending different distances from said fixing means.

16. A meter circuit protector casing wall member having relatively immovable members forming a socket to receive a portion of the terminal chamber of a meter, said socket having a base provided with an opening to provide entrance into said casing for conductors to said terminal chamber, said socket closely embracing the terminal chamber of each of certain meters with which it may be associated to prevent unauthorized access to conductors in said casing and said base opening being of sufficiently small size to cause said socket to cooperate with a meter terminal chamber of such style and size that the side walls of said socket can not closely engage therewith, to baffle access through said opening to said conductors when said chamber is positioned close to said base.

17. The combination with a meter protective casing having an open side and a cover having a flange partially closing said side, of a reversible meter adapter plate for bridging said open side and having a cutout at one edge, said cutout when positioned away from said cover being adapted to cooperate with the terminal chamber of a meter, and when positioned toward said cover being covered by said flange when said cover is in closed position.

18. A meter circuit protector comprising a casing having an opening and a single integral wall member bridging said opening, said protector including means adapting said wall member selectively to partially or to entirely complete the closing of said casing, and when partially completing such closing to cooperate with meter casings of various forms and sizes to prevent unauthorized access to conductors housed by said protector.

19. A meter circuit protector comprising a casing having an opening and a single movable wall member bridging said opening and provided with relatively permanently fixed elements, said protector including means adapting said wall member by means of said elements for cooperation with meter casings of various forms and sizes to prevent unauthorized access to conductors housed by said protector.

20. A meter circuit protector comprising a casing having an opening and a single movable wall member provided with relatively permanently fixed elements for bridging said opening, said protector including means adapting said wall member to complete the closing off of said protector when no meter is associated with said casing and by means of said elements for cooperation with meter casings of various forms and sizes to prevent unauthorized access to conductors housed by said protector.

21. A meter circuit protector comprising a casing having a wall member, said protector including means adapting said wall member for cooperation with meter casings of various forms and sizes to prevent unauthorized access to conductors housed by said protector, said adapting means comprising portions of said wall member partially defining a socket of permanently fixed dimensions within which certain of said meter casings may be extended.

22. A meter circuit protector comprising a casing having a wall member, said protector including means adapting said wall member for cooperation with meter casings of various forms and sizes to prevent unauthorized access to conductors housed by said protector and to complete the closing of said protector when no meter is associated with said casing, said adapting means comprising portions of said wall member partially defining a socket of permanently fixed dimensions within which certain of said meter casings may be extended.

23. A meter circuit protector comprising a casing having a wall member, said wall member consisting of a plate having a wall portion extending from one face and defining front and sides of a socket of fixed dimensions, said protector including means adapting said wall member for cooperation with meter casings of various forms and sizes to prevent unauthorized access to conductors housed by said protector, certain of said meter casings extending into said socket when associated with said protector casing.

24. A meter circuit protector comprising a casing having an opening of a size larger than the terminal housing end portion of any of a plurality of meters of different styles and sizes, and a single wall member bridging said opening and having integral parts for selective cooperation with any of said terminal housings to prevent access through said opening to conductors housed by said protector.

25. A meter circuit protector comprising a casing having an opening, a single movable wall member for bridging said opening and provided with relatively permanently fixed elements, a cover for said casing having a portion partly bridging said opening when the cover is closed, said protector including means adapting said portion and wall member to complete the closing off of said protector when no meter is associated with said casing and said cover is closed, and by means of said elements for cooperation with meter casings of various forms and sizes to prevent unauthorized access to conductors housed by said protector.

In testimony whereof we have affixed our signatures.

GRANVILLE E. PALMER.
ERNEST G. JOHNSON.

DISCLAIMER 1,770,425.—*Granville E. Palmer*, Brookline, and *Ernest G. Johnson*, Boston, Mass. SWITCH CASING AND METER ADAPTER. Patent dated July 15, 1930. Disclaimer filed February 9, 1932, by the assignee, *The Palmer Electric & Manufacturing Co.*

Hereby enters a disclaimer, as follows:

It hereby disclaims from the scope of claims 18 and 24 all constructions of the character described therein except those in which the single integral wall member must be reversed from the position occupied by it when the casing is incompletely closed to a different position to effect the complete closing of the casing.

[*Official Gazette March 15, 1932.*]